July 25, 1967 F. SCHLOSS 3,333,236
HYDROPHONE UNIT
Filed April 20, 1966
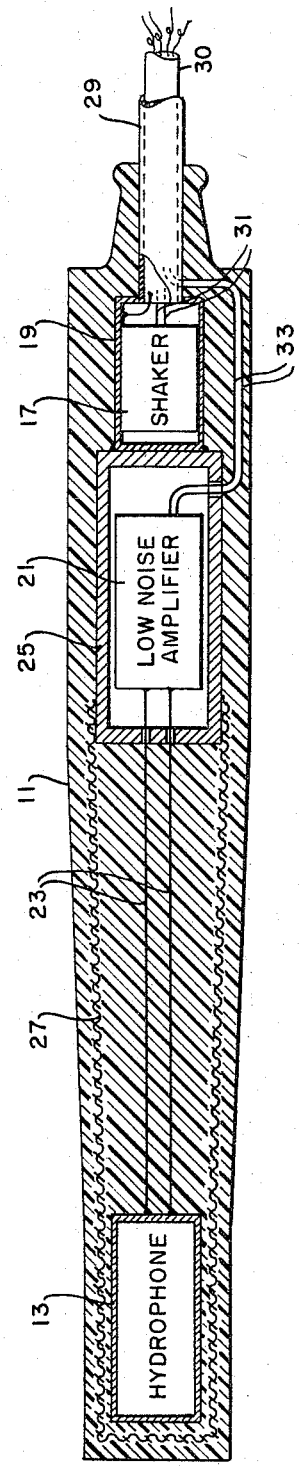
INVENTOR
FRED SCHLOSS
BY
ATTORNEYS

United States Patent Office 3,333,236
Patented July 25, 1967

3,333,236
HYDROPHONE UNIT
Fred Schloss, Arlington, Va., assignor to the United States of America as represented by the Secretary of the Navy
Filed Apr. 20, 1966, Ser. No. 545,226
9 Claims. (Cl. 340—8)

The invention described herein may be manufactured and used by or for the Government of the United States of America for governmental purposes without the payment of any royalties thereon or therefor.

This is a continuation-in-part of application Ser. No. 404,992, filed Oct. 19, 1964.

The present invention relates to a hydrophone unit having integrated into its construction means for producing a signal suitable for monitoring of the hydrophone. More particularly, there is provided in the unit itself electromechanical means for producing mechanical vibrations which "shake" the entire unit and which serve as test signals for the hydrophone. Changes in the operation characteristics, e.g., sensitivity, of the hydrophone may thus be observed while the hydrophone unit is in operational use.

Hydrophones having transducer elements of the type which are responsive to vibrations, such as for example, piezo-electric crystals, are known to change characteristics such as sensitivity with age, temperature and pressure. In the past, changes in characteristics of hydrophones have been observed either by generating test signals from a source external to the hydrophone unit, or by laboratory calibration. However, all known prior monitoring procedures have the disadvantage of requiring additional external test equipment or of requiring removal of the hydrophone unit from its operational location. A disadvantage of prior in situ monitoring systems is that where an external test signal source is employed additional sea noise may deleteriously affect the calibration.

It is therefore, among the objects of the present invention to provide a novel hydrophone unit having a noise free self-monitoring capability:

To provide a compact hydrophone unit of watertight and high pressure-withstanding construction so that the unit may be monitored or calibrated in situ without additional equipment such as externally located test signal sources;

To provide a novel hydrophone unit having integrated into its construction a source of mechanical vibrations as often as desired without appreciable interruption in the normal operation of the hydrophone unit;

To provide a hydrophone unit which is provided with an electrostatic screen and does not contain any ground loops between the ship and said hydrophone.

These and other objects of the invention, as well as its features and advantages, will be better understood by reference to the following detailed description and accompanying drawings in which the sole figure shown is a view in modified longitudinal cross section of a hydrophone unit according to an illustrative version of the invention.

In the sole figure, the hydrophone unit according to the invention consists of an elongated body 11 of material providing a watertight (and high pressure-withstanding) container for the unit components.

Preferably, the material of the body 11 has the same acoustic transmissivity characteristics as water and may, for example, be polyurethane. The polyurethane may be cast into a mold surrounding the components to embed the components therein. Although any suitable material may be employed for the body 11, polyurethane has an advantage in that it may be casted into a mold surrounding the components without introduction of such heat that would deleteriously affect the components to be embedded. In instances where high temperature-withstanding components are used, materials such as butyl rubber may be employed to form the body 11. Steps should be employed to reduce or eliminate the formation of air bubbles in the body. The completed hydrophone unit does not have a conductive path which includes the conductivity of the water in which the hydrophone is immersed.

The components of the hydrophone unit embedded in the body 11 include a hydrophone 13 of any suitable construction located near one end of the body 11. The hydrophone 13 may be of the piezoelectric type and is, embedded in the body 11.

Embedded within the body 11 near its other end is an electrodynamic shaker 17 of any suitable well-known construction. The shaker 17 is contained within, and rigidly attached, to a housing 19 capable of withstanding high external pressure so that the shaker is not subjected to external pressure. Preferably the shaker 17 is of miniature size. An example of a shaker suitable for use in the present invention is a geophone manufactured by Electro-Technical Products, Inc., of Houston, Tex., and which is connected to a suitable source of oscillatory power so that it operates as a vibration generator rather than as a pick-up. Electro-dynamic vibration generators of the foregoing and similar types are not deleteriously affected by aging and temperature, and thus, when provided with a high pressure-withstanding housing, retain substantially constant operating characteristics almost indefinitely.

In view of this aging and temperature stability and its isolation from pressure influence, this type of shaker provides a good reference against which the hydrophone may be calibrated.

Inasmuch as electrodynamic shakers are well known in the art, the shaker 17 will not be described in detail. But as an explanation in aiding understanding of the present invention, the general arrangement of a suitable shaker may include a pre-aged permanent magnet in the form of a solid cylinder which is fixed at one end to the inside flat surface of a hollow cylindrical soft iron member. The walls of the soft iron member are spaced from the permanent magnet and terminate to form an open end approximately coextensive with the permanent magnet. An annular bobbin supporting energizing coils is attached by means of annular metal diaphragms to the soft iron member near its open end. The open end of the soft iron member may be provided with a non-magnetic cap.

As previously mentioned, the shaker 17 is rigidly attached to the housing 19. The housing 19 is embedded in the body 11 and is therefore rigid therewith. Energization of the coils at a suitable frequency vibrates the shaker coil and its diaphragm-supported bobbin. The body 11 reacts to this vibration and therefore, also vibrates. These vibrations are transmitted through the body 11 to the hydrophone 13.

A low noise amplifier 21 of any suitable well-known construction is located longitudinally adjacent the shaker 17 and as far as possible from the hydrophone to reduce acoustical reflection. The amplifier 21 is connected by leads 23 to the sensitive elements of the hydrophone 13 to receive and amplify the output of the hydrophone. The amplifier 21 is encased in a housing 25 of sufficiently strong construction to withstand high hydrostatic pressure. The housing 25 may be attached adjacent to, or welded integrally with, the shaker housing 19 to provide strong unitary construction. The amplifier housing 25 is electrically connected to the shaker housing 19.

A metallic screen 27 to provide electrostatic shielding for the hydrophone 13 is formed in the shape of an elongated cup with its closed end completely surrounding the hydrophone 13 and its open end secured to the amplifier housing 25, and the screen 27 is electrically connected to the housing 25 by the securing means. The screen 27 is selected to have a mesh such as will not deleteriously affect acoustic transmission to the hydrophone and to enable free flow of polyurethane therethrough during the casting of the unit so that no air bubbles are formed in the body 11. In practicing one version of the present invention, a screen of about 20 mesh has been found suitable.

A cable 29 provides means for carrying loads and for supporting the hydrophone unit. The cable 29 is provided with an electrical shield 30 for the leads, and the shield 30 is electrically connected to the ground of the supporting vessel or installation. If the cable 29 is of the non shielded variety then one of the leads in the cable is utilized as a ground lead. The shield 30 or the ground lead of the cable 29 is electrically connected to the shaker housing 19. The cable 29 is watertightly brought into the body 11 at the end adjacent the shaker and may be attached to the housing 19. The shape of the body 11 adjacent the cable may be tapered as shown to provide flexibility for cable movements.

Leads 31 for energizing the shaker coils are watertightly passed thru the housing 19 in any suitable manner so that the high pressure-withstanding capability of the housing 19 is not disturbed. Leads 33 embedded in the body 11 provide a conductive path for the output of the amplifier 21. Of course, care should be taken in locating the leads in the body 11 and in the cable 29 to minimize cross talk between the leads 31 and 33. The other end of the cable 29 is connected to a suitable source of oscillatory power (not shown) for energizing the shaker coils and to suitable receiving or monitoring means for the amplifier output.

In operation, as previously mentioned energization of the shaker coils causes shaking of the hydrophone 13 which results in an output signal due mostly to the hydrophone's acceleration sensitivity. At desired times while the hydrophone unit is submerged at sea, the change in sensitivity of the hydrophone 13 can be monitored by driving the shaker 17 at a known frequency and known current level. This monitoring is in addition to any electrical calibration that may be conventionally carried out. It is to be emphasized that the only electrically conductive path between the hydrophone and the surface installation is by way of the cable 26 and that no ground loop exists between the surface installation and the hydrophone, primarily those existing through the salt or fresh water surrounding the hydrophone. Also electromagnetic radiations from power lines, power generating equipment, machinery or other sources of electro magnetic radiation does not affect the performance of the present hydrophone because the hydrophone is completely shielded on all sides.

Obviously, many modifications and variations of the present invention are possible in the light of the above teachings. It is therefore to be understood that within the scope of the appended claims the invention may be practiced otherwise than as specifically described.

What is claimed is:
1. A hydrophone unit comprising:
a body of watertight material having an acoustic transmissivity essentially the same as that of water;
generator means located in said body for producing mechanical vibrations in said body;
watertight and pressure-tight means providing a housing for said generator means, whereby said generator means is substantially unaffected by external pressures and thereby provides a source of essentially constant reference signals for transmission to the body;
hydrophone means watertightly contained in said body and coupled to said body to receive said mechanical vibrations;
electrically conductive means for providing an oscillatory power input path for said generator and for providing an output path for said hydrophone means;
amplifier means connected to said hydrophone means and to said output path, said body being elongated and said generator means and said amplifier means are located in said body near an end opposite from said hydrophone means, said amplifier means having a housing;
electrostatic shielding means for said hydrophone means, said electrostatic shielding means surrounding said hydrophone and enclosing said hydrophone, said electrostatic shielding means being connected to said housing of said amplifier means;
whereby upon oscillatory excitation of said generator said hydrophone means produces an output signal representing hydrophone sensitivity.

2. A hydrophone unit according to claim 1 wherein said hydrophone means and said generator means are embedded in said body.

3. A hydrophone unit according to claim 2 wherein said body of material is polyurethane.

4. A hydrophone unit comprising:
an insulative body of watertight material being elongated in shape;
a hydrophone being embedded in one end of said insulative body, generator means for producing mechanical vibrations in said body said generator means being embedded in said body at the other end of said body; and
amplifier means being embedded in said body between said hydrophone means and said generator means, said amplifier being housed in a housing, both said amplifier and said hydrophone being vibrated by said vibration generator.

5. A hydrophone unit according to claim 4 wherein said hydrophone is provided with means for eliminating electrical ground loops.

6. A hydrophone unit according to claim 5 wherein said electrical ground loop eliminating means comprises an electrostatic shielding means surrounding said hydrophone and enclosing said hydrophone, a cable having a reference conductor, said reference conductor being electrically connected to said hydrophone shield means.

7. A hydrophone unit according to claim 6 wherein said body of material is polyurethane.

8. A hydrophone unit according to claim 7 wherein said reference conductor of said cable comprises a shield for said cable, said cable having a plurality of leads, said leads being enclosed by said shield.

9. A hydrophone unit according to claim 6 wherein said reference conductor of said cable comprises a shield for said cable, said cable having a plurality of leads, said leads being enclosed by said shield.

References Cited
UNITED STATES PATENTS
3,224,246  12/1965  Schloss et al.

RODNEY D. BENNETT, *Primary Examiner.*

B. L. RIBANDO, *Assistant Examiner.*